US008637771B1

(12) United States Patent
Yankie et al.

(10) Patent No.: US 8,637,771 B1
(45) Date of Patent: Jan. 28, 2014

(54) ELECTROMOTIVE COIL WITH IMPROVED CONDUCTOR PACKING RATIO

(76) Inventors: Greald W Yankie, Ventura, CA (US);
Gregory S Graham, Ventura, CA (US)

(*) Notice: Subject to any disclaimer, the term of this patent is extended or adjusted under 35 U.S.C. 154(b) by 350 days.

(21) Appl. No.: 13/034,316

(22) Filed: Feb. 24, 2011

Related U.S. Application Data

(60) Provisional application No. 61/308,857, filed on Feb. 26, 2010.

(51) Int. Cl.
*H02K 3/04* (2006.01)

(52) U.S. Cl.
USPC ............ 174/87; 174/84 R; 310/195; 310/201; 310/208; 29/874; 29/882; 29/884

(58) Field of Classification Search
USPC ........... 174/87, 68.2, 72 B, 71 B, 88 B, 70 B, 174/99 B, 129 R, 133 R, 84 R, 33, 126.1; 310/179–184, 195–208; 322/39; 290/39; 439/15, 33; 29/846, 847, 842, 29/874, 882, 884; 361/611, 624, 637, 648
See application file for complete search history.

(56) References Cited

U.S. PATENT DOCUMENTS

| 3,618,206 | A | * | 11/1971 | Gubler et al. | 29/599 |
| 4,320,319 | A | * | 3/1982 | Takahashi | 310/266 |
| 4,365,656 | A | * | 12/1982 | Takahashi | 140/92.1 |
| 4,468,578 | A | * | 8/1984 | Takahashi | 310/198 |
| 6,160,327 | A | * | 12/2000 | Wang | 310/12.02 |
| 6,239,516 | B1 | * | 5/2001 | Floresta et al. | 310/12.21 |
| 6,293,803 | B1 | * | 9/2001 | Rust et al. | 439/33 |
| 6,294,739 | B1 | * | 9/2001 | Becker | 174/126.1 |
| 2002/0069508 | A1 | * | 6/2002 | Graham et al. | 29/596 |
| 2003/0020587 | A1 | * | 1/2003 | Graham et al. | 336/232 |
| 2005/0073209 | A1 | * | 4/2005 | Koike | 310/201 |
| 2007/0090714 | A1 | * | 4/2007 | Graham et al. | 310/195 |

* cited by examiner

*Primary Examiner* — Jenny L Wagner
*Assistant Examiner* — Dimary Lopez
(74) *Attorney, Agent, or Firm* — Laura Tunnell

(57) ABSTRACT

The disclosed invention describes a motor/generator coil produced using rectangular electric current conductors of any thickness and width. A unique joint between the up and down segments of the coil turn enables an improved conductor packing ratio and geometrical orientation that minimizes the effect of eddy currents. The resulting coil produces higher power than typical wire wound motors but is lighter weight and physically smaller in size. In addition, the coil can be free-standing, and is capable of slotless and/or ironless core device configuration.

17 Claims, 5 Drawing Sheets

ELECTROMOTIVE COIL WITH IMPROVED CONDUCTOR PACKING RATIO

BACKGROUND

Permanent Magnet Motors, Electronically Commutated Motors, Coreless, Ironless Core, Slotless, DC Brush, radial and linear electric motors and generators manufactured today typically use round magnet wire to produce the electrical current path within the electromotive coil winding. The circular shape of round magnet wire limits the amount of current carrying conductive copper that can be fit into a given volume. Motor designers strive to achieve conductor configurations that maximize the amount of copper in the magnetic field of the motor stator or armature to enhance motor performance. Motor coils with higher conductor packing-factor or slot-fill ratios exhibit better overall performance than coils with lower packing-factor or slot-fill ratios.

An electric motor coil construction for either armature or stator that maximizes the amount of conductors within the magnetic gap of the rotor decreases the electrical resistance of the circuit within the motor. As an electric motor armature and/or stator construction increases the amount of copper within the same space, electrical energy efficiency of the motor increases. Reduction of the coil electrical resistance (R) proportionally reduces the heat losses of the coil circuit due to the product of Current squared times electrical resistance. This lower resistance improves the amount of power that can be produced by a given electric motor.

Higher efficient use of energy is the result of this motor coil construction. The lowering of resistance in the coil and lowering of losses in the magnetic effects acting on the coil combine to enable a significant reduction of electrical usage in the resultant motor.

Motor coil construction and coil conductor shape impacts power losses in the coil called Eddy Current Losses resulting from a magnetic field sweeping the conductors. Eddy Current Losses are a function of the rate of change of the magnetic field. This loss is an exponential function of the frequency and limits the maximum speed of any motor.

A rectangular shaped electrical current conductor with the narrow dimension of the conductor presented to the rotating and oscillating magnetic field produced by the magnetic component of the motor will reduce the eddy current drag losses in the motor due to the exponential reduction of losses with a linear reduction in the width of the conductor facing the magnetic field. Reduction of Eddy Current Losses will additionally improve the electrical efficiency of the motor and will allow higher motor speeds before eddy core loss limits motor speed.

A narrow rectangular conductor will enable an increased number of electrical turns in a given space. This will allow for motor designs with a wider range of operating motor voltages and speeds.

Electrical insulation is used to coat magnet wire; many suitable choices are readily available. This insulation is required to protect the electrical circuit from high voltage breakdown. Wire coatings applied in the production of magnet wire have high insulating performance whereas the use of bare copper conductor construction requires very complete post construction addition of insulation encapsulation to reduce the risk of high voltage breakdown capability.

Traditional motors use round wire electric current conductors to fill the space allowed for the production of inductive coils. Round wire will fill only 55% of the space available with copper. Rectangular wire construction can be nested to better fill the space and achieve up to 85% fill of the available magnetic field space with copper. Higher conductor fill ratios or higher copper packing factor increases the power capability of the resulting motor.

Round wire can be bent into a radius to allow construction of a coil with each two end turns and each complete turn of wire will create one side of the turn traversing up and one side traversing down. This creates excessive length in the end-turn thereby increasing the electrical resistance of the coil. Making a shortened end turn will decrease the resistance of the circuit relative to round wire construction. End turns of continuous wound coil construction increases the overall length of the wire for each turn of the coil therefore increasing the overall electrical resistance of the coil. An end turn construction with a mechanically bonded joint reduces the length for each turn in the coil assembly reducing the overall length of the coil, reducing weight and reducing electrical resistance.

SUMMARY OF INVENTION

This motor coil invention is in a configuration typically called ironless core and slotless construction using rectangular copper "magnet wire", pre-coated with insulation as received from the wire manufacturer. Using rectangular wire for the coil construction requires a method for turning the wire at the ends of the coil to reduce electrical resistance. By using pre-insulated and pre-coated rectangular wire, separate and individual conductors for each of the up and down segments of the turn and using a unique method of connecting the ends of each electrical current conductor would allow the construction of a shortened turn within the motor coil. Multiple conductors connected in this manner and built into a motor coil will provide the lowest electrical resistance for a comparably sized round wire armature or stator construction and reduction of induced Eddy Current Losses within the coil assembly.

This coil invention makes possible the tight packing arrangement of electrical current conductors as seen in FIG. 10. The narrow dimension of the rectangular conductor faces the magnetic field. The outer and inner conductors are stacked together in such a way as to essentially eliminate air space between the conductors. Only a thin layer of electrical insulation 440 separates the electrical conductors, thereby resulting in a dense copper packing factor. The geometry of round magnet wire does not allow for the high packing factor as compared to the rectangular wire shown in FIG. 10, which results in over 50% more copper in the magnetic field compared with round magnet wire in the same space.

The structural coil design of this invention results in closely stacked and nested rectangular electrical current conductors in such a way that the completed coil is rigid and free-standing. The mechanical bonding of each conductor end-turn adds to the structural integrity of the coil. No metallic, slotted lamination stacks are required to give structural support for the electrical conductors.

The electrical current conductor is orientated with the narrow dimension facing the magnetic field. This orientation will reduce the effect of eddy currents being generated by the oscillating magnetic field. Square wire and round wire can be manufactured in this manner to provide some improved motor performance benefits but motor performance will not be optimal. FIG. 8 is an illustration depicting Eddy Currents in Conductors within a magnetic field. As a magnetic field sweeps the conductors, an electric current (Eddy) is induced in the wire because the electrons within the conductor are subjected to an increasing magnetic field as the magnet approaches. This produces an EMF (electromotive force) that acts upon them. The circulating currents generate heat within the conductors reducing the performance of the motor. The narrower width of the electrical current conductor facing the magnetic field reduces the circulating currents thereby reducing the magnitude of the eddy current and therefore increasing motor performance.

Another advantage of orienting the narrow edge of the electric current conductor facing the magnetic field is that more conductors, therefore more coil turns, can be stacked per length of a linear motor coil. This feature means the motor designer can configure a coil with a wider range of motor speed for a given motor voltage.

This innovative coil construction with the forming of the individual up and down rectangular electrical current conductors requires specific sized wire and different end turn shapes to fit the desired geometry for a given motor design. For a circular stator construction the shape and diameter curvature are different between the inside conductor and the outside conductor. Each conductor end space will require the ability to connect to each other. Each end of each conductor is mechanically formed to create a bonded joint that exhibits low electrical resistance and high mechanical strength necessary to withstand the load forces during motor operation. Each end of each conductor is shaped in such a way that two conductors can be mated for bonding and the total conductor thickness at the bond area does not exceed the thickness of one conductor thickness. This is accomplished by shaping the conductor material to provide for nesting and bonding of the two conductor ends. There are several mechanical shapes and techniques that are envisioned to accomplish this important conductor bonding task.

OBJECTS OF THE INVENTION

A motor/generator coil produced using rectangular electric current conductors of any thickness and width.

A free-standing coil (does not require additional mechanical support) capable of slotless and ironless core device configuration.

A coil that maximizes the electrical current conductor packing factor or copper fill ratio; highest volume of copper in the magnetic field.

A coil that maximizes the number of electrical conductor turns within a given space.

A coil that minimizes coil eddy currents thereby reduces energy loss and increases electrical efficiency.

A coil that minimizes electrical resistance of the conductors in the magnetic field and reduces end turn length, thus reducing energy loss and heat of the device caused by the product of Current squared times electrical resistance.

A coil that functions with exceptional electrical efficiency thereby reducing electrical consumption.

A coil that produces higher power than typical wire wound motors but is lighter weight and smaller physical sized.

The aforesaid goals are realized with a joined pair of electrically conductive elements comprising a first conductive element and a second conductive element, wherein each of the first and second conductive elements comprises an elongated conductor having two ends and a length therebetween. The length of each of the elongated conductors has a rectangular cross section with a long dimension and a short dimension. At least one of the two ends has a formed cross section, the formed cross section of the first conductive element being mated to the formed cross section of the second conductive element, thereby forming a mated joint between the first and second conductive elements. The mated joint also has a long dimension and a short dimension and the short dimension of the mated joint is equal to the short dimension of the rectangular cross section of each the elongated conductors.

Each of the two ends of each conductive element as described above can be mated to an adjoining conductive element. The joined pairs can then be mated to an adjoining set of joined pairs, thereby forming a linear array of joined pairs. Two or more such arrays of joined pairs can then be nested. Because each of the arrays has a leading conductive element and a trailing conductive element, the leading conductive element can form a joined pair with the trailing conductive element thereby forming a continuous ring of nested arrays. The long dimension of each of the conductive elements within each of the nested arrays is aligned with the radial dimension of the continuous ring. Grouping of such continuous rings can be formed, wherein each grouping is operable as one phase of a multiphase coil.

By virtue of the rectangular cross-sectional geometry of each element and each joint, such a multiphase coil has a conductor packing ratio of between 65% and 85%. Moreover, since the magnetic field only encounters the short dimension of each element and each joint, eddy currents are reduced as are power losses. In addition, the mechanical strength of such a multiphase coil as described above enable it to be freestanding. It also can be slotless and/or ironless.

A method of joining a pair of electrically conductive elements is also described. The method comprises the steps of presenting two conductive elements, wherein each of the two conductive elements has a rectangular cross section with a long dimension and a short dimension. The first end of the first of the two conductive elements is shaped. The second end of the second of the two conductive elements is shaped and mated to the end of the first of two conductive elements. Thus, a mated joint is formed. The mated joint also has a rectangular cross section with a long dimension and a short dimension.

Furthermore, the short dimension of the mated joint is equal to the short dimension of the conductive elements.

The method may further comprise shaping a second end of the first of the two conductive elements, then shaping a first end of a third conductive element and mating it to the second end. A first end of the second of the two conductive elements can be shaped and mated to a second end of a fourth conductive element. The preceding two steps can be repeated multiple times to form a linear array of joined pairs. One may then construct a nested group of a plurality of linear arrays. The free ends of such nested groups can subsequently be joined so that a continuous ring is formed. The long dimension of each mated joint within the ring will then be aligned with the radial component of the continuous ring. The method further provides for the formation of an assembly of two or more nested continuous rings such that the assembly is operable as a multiphase coil having a conductor packing ratio between 65% and 85%.

DESCRIPTION OF DRAWINGS AND ITEMS WITHIN THE DRAWINGS

FIG. 1; Individual conductor with elements
102: individual conductor
100: formed end detail
110: formed opposite end detail.
FIG. 2; End turn detail with elements
200: remaining conductor thickness
210: thin formed section
220: thinned formed section.
FIG. 3; Shows End Turn Joint with elements
100: formed end section
110: formed opposite end detail 310: joining material.

FIG. 4; Conductor showing three conductors, joined with element
  400: inner conductor
  410: outer conductor.

FIG. 5; Multiple, adjacent conductors Phase segment of coil with elements
  400: inner conductors multiple repeated conductors
  410: outer conductors multiple repeated conductors FIG. 6; Three Phases cascaded with elements
  600: single phase of repeated conductors
  610: 2nd phase of multiple repeated conductors
  620: $3^{rd}$ phase of repeated conductors.

FIG. 7; Full Three phase fill of space with elements 600, 610, 620 repeated

FIG. 8; Eddy Currents Diagram with elements
  400: inner conductors
  410: outer conductors
  830: magnetic flux lines
  840: direction of magnetic circuit rotation FIG. 9, Photo of completed coil prototype.

FIG. 10; Packing Factor advantage of rectangular conductors with elements
  400: inner conductors
  410: outer conductors
  440: insulation around conductors.

FIG. 11; Packing Factor comparison with round wire with elements
  900: copper cross section of round wire
  910: wire insulation
  920: space between conductors

DETAILED DESCRIPTION OF THE PREFERRED EMBODIMENT

The electromotive coil construction is made using insulated rectangular wire cut into individual segments 102 and formed to fit as required by the electromotive device design. Here described is the construction of a Permanent Magnet Brushless Stator, as used in a slotless or ironless coil linear motor construction.

FIG. 1 shows the individual electric current conductors formed to the length required and each end of the conductors 102 formed for joining at a later sequence.

FIG. 2 shows the conductor end mechanically formed in a forming tool, detail end view only. The end of each conductor has a feature described as item 200, 210 and 220 mechanically formed into each end of the conductor 102 to enable nesting of two mating conductors. The insulation is removed from the area of mechanical forming to ensure a clean area for the mating and bonding surfaces. Each end of conductor 102 is mechanically formed to create a nesting feature to enable nesting of two mating electrical current conductors. The resultant formed area is ready for joining to a mating conductor. The thickness of mechanically formed features in FIG. 2 and the bonding material 310 does not exceed the original thickness of the starting electrical current conductor.

FIG. 3 shows an end view of an end turn joint after nesting two electrical current conductors 102 and bonding at joint 100,110 with joining material 310 such as soldering compound.

The joints are prepared for mating or nesting two electrical current conductors. The inner conductor surface 100 and the outer conductor surface 110 are positioned for permanent joining. Soldering of the joint 310 using industry techniques will result in a low resistance electrical connection due to the large surface area of the joint. It is important that the joint have mechanical strength and low electrical resistance. The heat losses resulting from the product of Current squared times Resistance will be lower in the joint than in the individual conductors preventing an area of high heat generation at the location of bonding. This will allow the resultant motor coil assembly to withstand the high currents during startup and peak power demands.

FIG. 4 shows three electrical current conductors, nested and joined together, two inner conductors 400 and one outer conductor 410.

The electrical current conductors are arranged to provide a series of conductor sets as required by the magnet pole pair spacing. The sequence of assembly is to join an inner conductor to an outer conductor followed by the inner conductor, repeated as required to match the number of pole pairs and turns of conductors in the magnetic circuit design.

FIG. 5 details multiple adjacent electrical current conductors 400 and 410 creating one phase segment of the coil assembly's three-phase coil.

The string of electrical current conductors 400 and 410 are shaped to nest adjacent to each other. This group of conductors shows a pattern that would be repeated to match the number of pole pairs in the magnetic circuit design.

FIG. 6 shows three-phases interlaced 600, 610 and 620 to cover the area in the magnetic field.

This sequence is repeated to match the number of pole pairs in the magnetic circuit design. Each phase is aligned and cascaded as per a three-phase system shown in FIG. 6.

Figure 10:
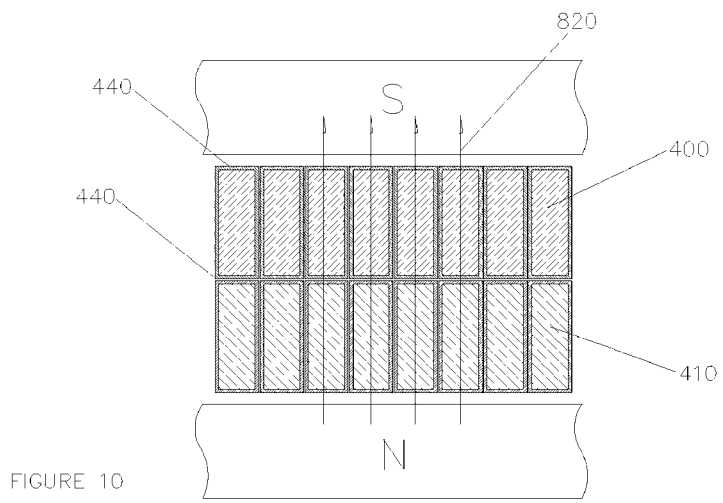

FIG. 10 show the packing factor of two layers of electrical current conductors with the narrow edge of the conductors facing the magnetic field. FIG. 10 is a partial cross-sectional view through the finished linear motor coil showing the tightly packed conductors with electrical insulation 440 between and around the copper core of the wire with two layers of electrical current conductors, the upper row being the outer layer 410 and the bottom layer being the inner layer 400 of conductors. The magnetic flux lines 820 are shown in relationship to conductors.

Figure 11:
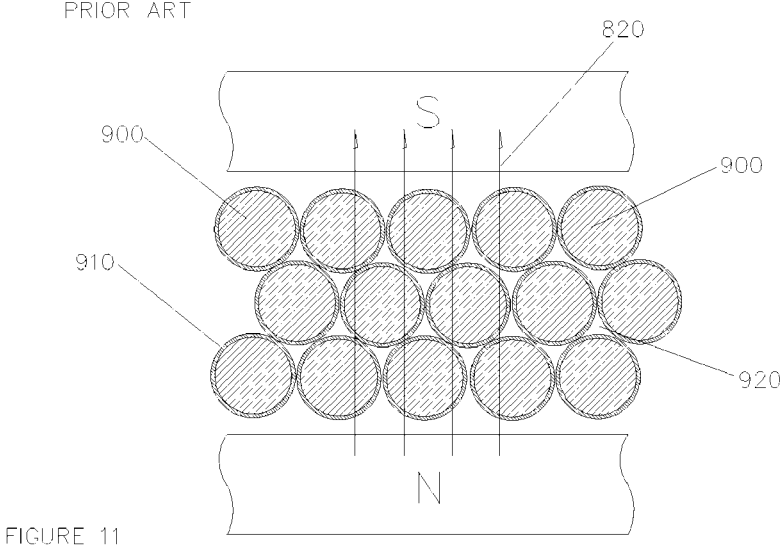

FIG. 11 shows a comparison diagram with round conductors of the same cross sectional area as the rectangular conductors shown in FIG. 10. The copper area 900 with insulation 910 is shown with space 920 between the conductors.

Figure 1:
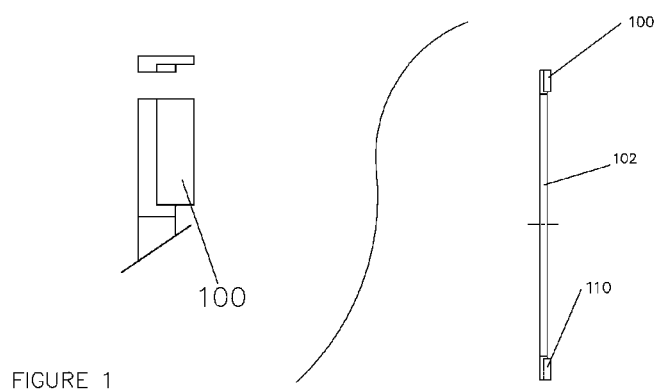
Figure 2:
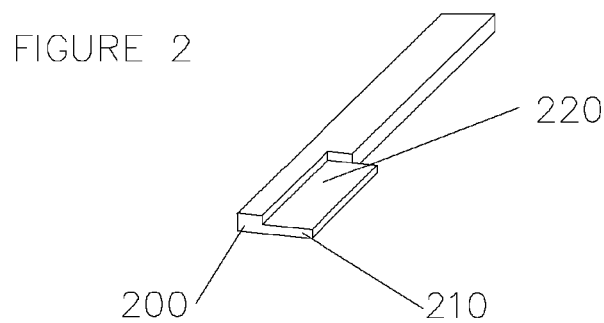
Figure 6:
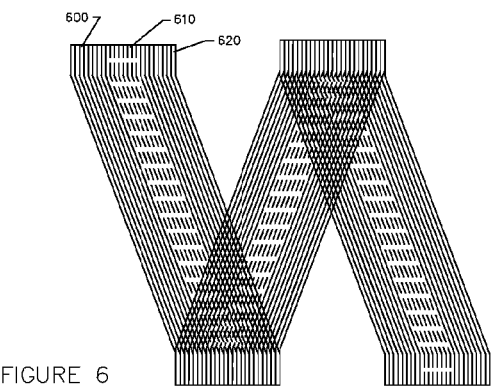
Figure 7:
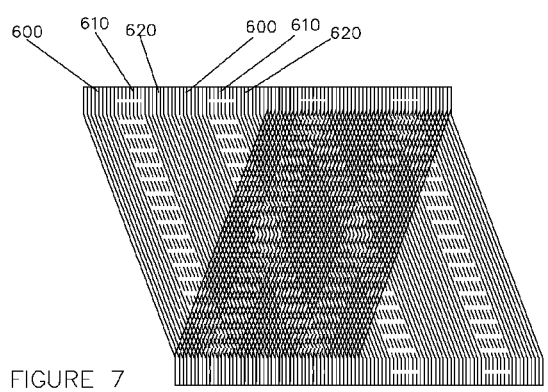
FIG. 7 shows the forward phases that are then cascaded with the tailing electric current conductors to fill the remainder of the gap space as shown. The completed coil shows full three-phase circuit configuration.
Figure 8:
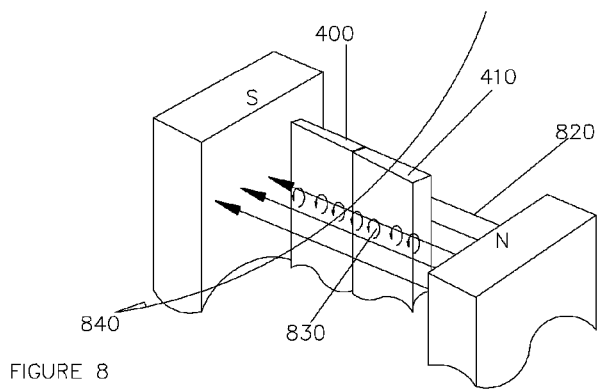
FIG. 8 is an illustration depicting Eddy Currents 830 in Conductors 400,410 within a magnetic field 820 with movement of either the magnetic field 840 or the resultant motor armature.

The present invention relates to an ironless core, free-standing electromotive coil FIG. 7 for an electronically commutated three-phase linear motor. The preferred embodiment of novel electromotive coil is constructed from rectangular copper magnet wire 102 pre-coated with electrical insulation as received in coil form from the wire manufacturer and commonly called magnet wire. The cross sectional dimension of the rectangular wire can vary and is dependent on the motor performance requirements and the electrical specifications of the motor designer. The preferred copper wire 102 is cut to a specified length corresponding to the size of the electromotive coil design. This length of wire is placed into a forming tool that forms each end of the wire 100,110 in a manner as shown on FIGS. 1 and 2. FIG. 1 shows the top view of the mechanically formed section of the electrical current conductor. FIG. 2 shows the end view of the mechanically formed section of the electrical current conductor 100,110. The forming tool mechanically deforms the copper material to produce shaped features 100 and 110 at the end of each conductor 102 whereby the wire is widened and thinned to create a matching and mating connection point 100 and 110 for two matching and mating electric current conductors. Multiple electric current conductors 102 are formed in the forming tool and these conductors are tightly nested and placed in series as seen in the progressive pattern shown in FIGS. 5, 6 and 7. Prior to nesting, the conductors are further formed into an angular shape with the inner conductors 400 angled to the left and the outer conductors 410 angled to the right, creating an off-set pattern FIGS. 4, 5, 6 and 7 necessary to complete an electrical current flow path. Each electric current conductor 400 and 410 is alternately mated to an adjacent conductor at the connection point referred to above as the coil end-turn and is electrically and structurally bonded at conductor mating surfaces 310 as seen on FIG. 3. The preferred bonding technique being high temperature solder 310 in the mating joint as shown on FIG. 3. Each conductor is nested such that the mating joints 300 and 320 on each end of conductors 400 and 410 are in intimate contact to receive the bonding solder at the connection joint 310. When all the electrical current conductors are tightly nested FIG. 7 and the bonding of all conductor ends FIG. 3 completed, the free-standing structural coil is ready for the connection to three-phase wiring and attachment to a three-phase electronically commutated motor controller and electrical power supply.

Figure 3:
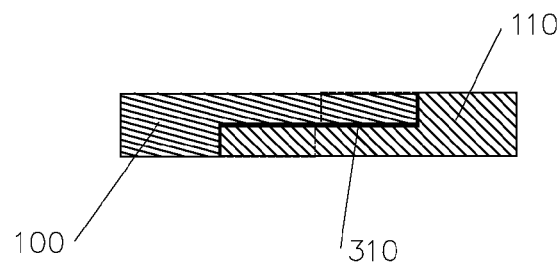
Figure 9:
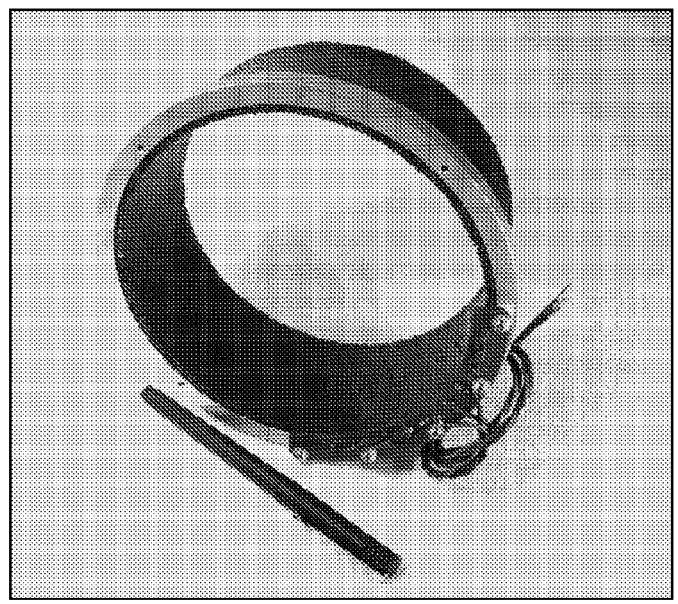
FIG. 9 is a photograph of a completed coil for either a rotational coreless, ironless core or slotless motor construction. This is accomplished by rolling the finished linear coil in FIG. 7 and electrically joining to ends of the linear coil to complete the cylindrical shaped coil.

Another embodiment of this coil invention relates to rotating motors and generators where the coil construction described above and shown in FIG. 7 is built in a flat format and rolled to form a cylindrical shape as shown in FIG. 9 and each end of the flat linear coil is electrically connected and bonded with solder 310 at each mating joint as shown on FIG. 3.

There are several mechanical shapes and techniques that are envisioned to accomplish this important conductor bonding task. See FIGS. 1, 2 and 3 for preferred embodiment of joint design. It is realized that alternate shapes of the mechanically formed end turn can be utilized. Many methods of joining the conductors can be utilized. Methods such as brazing, ultrasonic welding, resistance welding, riveting, interlocking shaped joining and crimping are envisioned as methods for joining the conductors.

In another embodiment, the electrical connection at the end turn is accomplished by butt welding conductors instead of lap bonding the conductors, the joint width at the butt weld does not exceed the width of the individual conductor thickness.

While the preferred embodiment is an electrical connection (FIG. 3) such that the finished and bonded joint thickness between two electrical current conductors does not exceed the thickness of the conductor, other embodiments are envisioned where the joint thickness does exceed the thickness of one conductor. However, any excessive joint thickness thereby decreases the number of conductors that can be nested and packed into a given coil length, decreasing the copper packing factor, decreasing the overall performance of the resulting motor coil. Increasing the spacing between nested conductors because of excess joint thickness reduces copper packing factor and reduces motor power but the reduction of Eddy Current Losses is achieved because of the narrow conductor edge is oriented to face the magnetic field.

Figure 4:
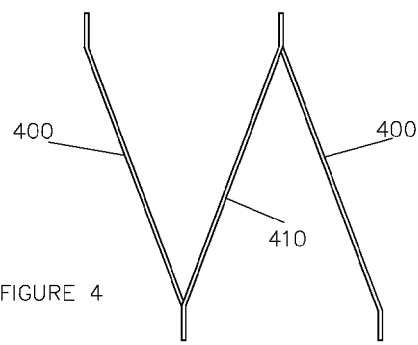

Attaching many individual conductors in series FIG. 4 is built and configured into the circuit as desired by the electromotive device designer. Circuit configurations called Lap Winding and Wave Winding can be constructed with this technique.

Figure 5:
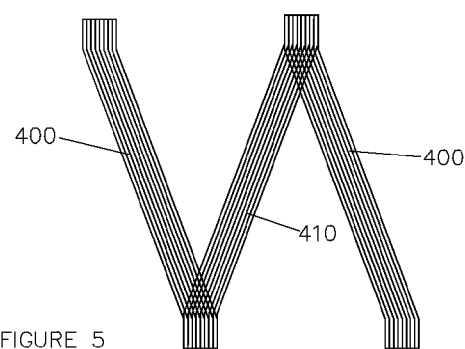

FIG. 5 shows the preferred embodiment layout for a flat or linear motor coil construction showing the nesting of multiple adjacent conductors creating one electrical phase of the coil. FIG. 6 shows the nesting of three electrical phases cascaded 600, 610,620. FIG. 7 shows repeated additional conductors nested to fill the three-phase space and represents the surface view of the finished linear motor coil. FIG. 9 is the resultant coil assembly for a rotational coreless, ironless core or slotless motor construction, accomplished by wrapping the flat or linear motor coil into a circular shape and electrically attaching the ends of the flat coil.

This innovative linear motor coil construction also applies to rotating electric motors either Permanent Magnet Motors or Electronically Commutated Motors, AC motors as well as brush commutated motors, i.e., electromotive coil assemblies.

In addition to copper wire, other electrically conductive materials can be used for examples, aluminum or gold, silver, etc.

Coil structure can be further strengthened by solvent welding bondable wire insulation by applying a solvent to the insulation after the coil is fully assembled.

Coil structure can be further strengthened and made more rigid by encapsulating and impregnating the finished and assembled coil with chemical resins or potting compounds, such as polyimide, polyesters or epoxy.

Fiber or other reinforcement techniques can be use to increase the strength of the coil assembly.

The electrical current conductor 102 can be produced by an alternate method whereby a bare copper conductor, without electrical insulation, is manufactured to the shape seen in FIG. 1 to form mating bond joint areas whereby the bare conductor is subsequently electrically insulated either before or after the mechanically bonding 310 of the machined joints 100,110 as shown in FIG. 3.

The above description discloses an enabling embodiment of the invention and includes the best mode presently contemplated for carrying out the invention. This description is not to be taken in a limiting sense, but is made merely for the purpose of describing the general principles of the invention. Various modifications and variations may be made in the present invention without departing from the scope and spirit of the invention. Features illustrated or described as part of one embodiment can be used in another embodiment to provide yet another embodiment. Thus, it is intended that the present invention covers such modifications and variations as long as they come within the scope of the appended claims and their equivalents.

The invention claimed is:

1. A joined pair of electrically conductive elements comprising;
   a. a first conductive element and a second conductive element, wherein each of said first and second conductive elements comprises an elongated conductor having two ends and a length therebetween,
   b. wherein said length of said elongated conductors defines a longitudinal axis, and a rectangular cross section perpendicular to said longitudinal axis, said rectangular cross section having a long dimension and a short dimension,
   c. wherein at least one of said two ends has a formed cross section, said formed cross section having a long dimension, a short dimension, a plane perpendicular to said long dimension, a plane perpendicular to said short dimension, a mateable surface in said plane perpendicular to said long dimension, a mateable surface in said plane perpendicular to said short dimension, and a mateable surface in said rectangular cross section perpendicular to said longitudinal axis, d. such that said formed cross section of said first conductive element forms a three dimensional mated joint to said formed cross section of said second conductive element, and e. wherein said short dimension of said mated joint is equal to said short dimension of said rectangular cross section of each said elongated conductors.

2. The joined pair of conductive elements as in claim 1, wherein each of said two ends of each conductive element are similarly mateable to an adjoining conductive element.

3. A set of the joined pairs of conductive elements as in claim 2, wherein each of said joined pairs is similarly mated to an adjoining set of joined pairs, thereby forming a linear array of joined pairs.

4. Two or more arrays of the joined pairs as in claim 3, wherein said two or more arrays are nested.

5. Nested arrays of the joined pairs as in claim 4, wherein each array of said nested arrays has a leading conductive element and a trailing conductive element, wherein said leading conductive element forms a joined pair with said trailing conductive element thereby forming a continuous ring of nested arrays, said continuous ring having a circumference and a radial dimension, and wherein said long dimension of each of said conductive elements within each of said nested arrays is aligned with said radial dimension.

6. One or more groupings of continuous rings as in claim 5, wherein each grouping is operable as one phase of a multiphase coil, said multiphase coil having a conductor packing ratio between 65% and 85%.

7. A multiphase coil as on claim 6, said multiphase coil being free-standing.

8. A multiphase coil as on claim 6, said multiphase coil being slotless.

9. A multiphase coil as on claim 6, said multiphase coil being ironless.

10. A multiphase coil as on claim 6, said multiphase coil being free-standing and slotless.

11. A multiphase coil as on claim 6, said multiphase coil being free-standing and ironless.

12. A multiphase coil as on claim 6, said multiphase coil being free-standing, slotless, and ironless.

13. A method of joining a pair of electrically conductive elements comprising the steps of:

a. presenting two conductive elements, wherein each of said two conductive elements has a longitudinal axis, and a rectangular cross section perpendicular to said longitudinal axis, wherein said rectangular cross section has a long dimension, a short dimension, a plane perpendicular to said long dimension, and a plane perpendicular to said short dimension, b. shaping a first end of the first of said two conductive elements to form a mateable surface in said plane perpendicular to said long dimension, a mateable surface in said plane perpendicular to said short dimension, and a mateable surface in said plane Perpendicular to said longitudinal axis, c. shaping a second end of the second of said two conductive elements such that it is mateable to said end of said first of two conductive elements, thereby forming a three dimensional mated joint, said three dimensional mated joint also having a rectangular cross section with a long dimension and a short dimension, and d. wherein said short dimension of said mated joint is equal to said short dimension of said conductive elements.

14. The method of claim 13 further comprising the steps of:

a. similarly shaping a second end of said first of said two conductive elements, similarly shaping a first end of a third conductive element and mating it to said second end, b. similarly shaping a first end of said second of said two conductive elements, similarly shaping a second end of a fourth conductive element and mating it to said first end, c. repeating steps a) and b) multiple times to form a linear array.

15. The method of claim 14 further comprising the steps of:

a. forming a plurality of linear arrays, b. grouping said plurality of linear arrays so that they are nested.

16. The method of claim 15 further comprising the step of joining the two ends of each linear array within said nested group such that a continuous ring is formed, wherein the long dimension of each mated joint is aligned with the radial component of said continuous ring.

17. The method of claim 16 further comprising the step of forming an assembly of two or more nested continuous rings such that said assembly is operable as a multiphase coil having a conductor packing ratio between 65% and 85%.

* * * * *